United States Patent
Axelson et al.

(10) Patent No.: US 6,493,549 B1
(45) Date of Patent: Dec. 10, 2002

(54) OVER THE AIR PARAMETER ADMINISTRATION FOR MOBILE TELECOMMUNICATIONS STATIONS

(75) Inventors: Jon William Axelson, Yorkville, IL (US); Jeffrey Lynn David, Lisle, IL (US); Richard Stephen Hauck, St. Charles, IL (US); James Dale Houge, Naperville, IL (US); David Walter Vollman, Naperville, IL (US)

(73) Assignee: Lucent Technologies Inc., Murrary Hill, NJ (US)

( * ) Notice: Subject to any disclaimer, the term of this patent is extended or adjusted under 35 U.S.C. 154(b) by 0 days.

(21) Appl. No.: 09/501,921

(22) Filed: Feb. 10, 2000

(51) Int. Cl.7 .................................. H04M 3/00
(52) U.S. Cl. ................... 455/419; 455/418; 455/186.1; 340/825.35
(58) Field of Search ................. 455/418, 419, 455/403, 550, 414, 420, 410, 433, 551, 560, 435, 186.1, 188.1, 852, 861; 340/825.34, 825.44

(56) References Cited

U.S. PATENT DOCUMENTS 6,115,607 A * 9/2000 Holcman .................... 455/422
6,195,546 B1 * 2/2001 Leung et al. ................ 340/5.1
6,400,948 B1 * 6/2002 Hardin ........................ 455/419
6,408,175 B1 * 6/2002 Park ............................ 380/247

* cited by examiner

Primary Examiner—Daniel Hunter
Assistant Examiner—Pablo N Tran
(74) Attorney, Agent, or Firm—Werner Ulrich

(57) ABSTRACT

An improved method of updating parameters stored in memory of mobile telecommunications stations. An object model represents all the parameters that can be modified in an IS-683A mobile station. The details of the physical location of each parameter are defined in this mobile object model. Advantageously, when any parameter is changed or added, it is necessary to provide the computer system, which generates messages to be transmitted to the mobile station, only the identification and value of the parameter to be added or changed. The computer system then generates a message sequence that defines the memory location in the mobile station to be changed, and the new value of the data for that memory location. Advantageously, this arrangement sharply reduces the total number of airwave messages transmitted to the mobile station in order to change or add a parameter.

3 Claims, 3 Drawing Sheets

OVER THE AIR PARAMETER ADMINISTRATION FOR MOBILE TELECOMMUNICATIONS STATIONS

TECHNICAL FIELD

This invention relates to arrangements for initializing and updating the memory of mobile telecommunications stations.

PROBLEM

In order to define the service that is provided to a mobile telecommunications station, usually a mobile telephone station, it is necessary to initialize, and subsequently update the data for defining the service capabilities that is stored in a non-volatile electrically alterable memory of the station. For example, the telephone number of the station is retained in its memory.

Also retained is information for defining the areas where roamer service is provided to the station. Roaming service is service provided by a service provider other than the primary service provider for providing service to the station when the station is not in its own local or home area. Complicated sets of agreements define which carrier, if any, will handle calls when the station is outside its own local area. Each station has a list of system identifiers of systems that will serve that station through roaming agreements. When a station turns on power, when it is outside its own local area, it scans for a sufficiently strong signal from a control channel. It identifies itself to that control channel along with a called telephone number, and the initial message from that control channel will contain the system identifier of that control channel. The system identifier contains information identifying a service provider, (carrier), and the area which the control channel serves. (Thus, for example, AT&T in Texas will have a different system identifier than AT&T in Illinois).

If the system identifier provided by the carrier is on a list of the system identifiers that serve the station, then further messages are exchanged over that control channel in order to register the mobile station. If the mobile station is not in its home area, then a Visitor Location Register, (VLR) entry is created for the registering station based on information received from the Home Location Register, (HLR) information for that station obtained via the IS-41 signaling network. (IS-41 is a signaling standard that overlays the Signaling System 7 signaling standard. IS-41 adds features that support mobile communication such as cellular telephones and Personal Communication Systems (PCS).)

If the system identifier provided over the control channel originally addressed is not on the list of system identifiers stored in the mobile station, then the mobile station will look for another control channel over which it can communicate with another service provider, and will make a similar attempt.

If all attempts to reach a service provider result only in finding service providers whose system identifier is not on the list stored in the mobile station, then normal registration cannot take place. In some cases, the mobile simply cannot make a call. In other cases, the mobile can reach an operator of a service provider and place a call, such as a calling card call, for which the service provider completing the call can be assured of receiving payment even if there is no agreement with the local service provider of the mobile station. Emergency calls, such as E-911 calls, are not blocked by roaming agreements, and will be completed by the carrier of the initial control channel over which the mobile station sends its request The above description has served as an explanation for the requirement that the mobile station store a list of system identifiers for service providers with which the local service provider has made a roaming agreement. Mobile stations that comply with the IS-683A standard can store hundreds of such agreement entries. (IS-683A is a standard for Code Division Multiple Access (CDMA) digital radio used in cellular telephones. IS-683A is also used in CDMA Personal Communication Systems (PCS).)

It will be appreciated that the contents of that list should be altered whenever new agreements are made. If the new agreements add territory, failure to alter the list provides degraded service to the subscriber, since the subscriber will not be able to take advantage of the increased roaming area. If a change is made in the service provider for an area in which roaming was already possible, then the subscriber will be denied roaming service where the subscriber already had roaming service, and where roaming service would, in fact, would be possible through parameter changes that reflect the changed agreements. Accordingly, it is important that telephone stations be updated whenever the roaming list changes, a phenomenon which, at the present time, may happen as frequently as monthly. Other data which is stored in the memory of the mobile station may also have to be changed. For example, if the area code of a large number of mobile stations is changed, the revised area code must be provided to all affected mobile subscriber stations in a relatively short interval of time.

A problem of the prior art is that the arrangements for updating memory in, for example, an IS-683A mobile subscriber station, require a large number of airwave messages.

These messages are not carrying subscriber traffic, which would produce revenue for the service provider, and consequently, are seen as a cost to the service provider in a given cell. In the IS-683A airwave standard, a cell has a finite number of airwave codes to allocate to subscribers. If a mobile station is using one of these finite resources for receiving parameter update messages, another mobile station in that serving cell may be blocked from service, even if that service could otherwise produce revenue for the service provider. Even if there are sufficient resources to satisfy all subscribers, including those receiving parameter updates, it is also possible that the subscriber can de-register the mobile station, (e.g., powering-off the mobile station), before the parameter updates have completed. In such a case, the entire update sequence must be repeated from the start. In the prior art, where a large number of airwave messages are required to perform parameter update, (sometimes extending over four minutes), de-registration of a mobile station before successful update is a high probability. Another problem of the prior art is that the human interface between the system administrator and the computer system for generating these airwave messages is awkward, requiring extensive interaction between the system administrator and the computer system, and requiring of the system administrator an expert level of detailed knowledge of the internals of IS-683A mobile stations. Service providers are consequently burdened with the additional cost of training and maintaining a high skill level in these administrators.

SOLUTION

Applicants have further analyzed the characteristics of the prior art arrangement. Mobile stations complying with the IS-683A airwave standard have parameters that are updated in blocks. For example, the already mentioned roaming list is one parameter block. Likewise, the directory number of the mobile station lies within a different parameter block. The prior art re-initializes all memory within a parameter block, even parameters that do not need to be updated. Thus, the prior art results in larger number of messages than are necessary to update changed parameters in an IS-683A mobile station. Moreover, the prior art requires a detailed knowledge of the memory layout of an IS-683A mobile station in order to create a parameter block that can properly overwrite the one existing in the mobile station. Finally, the prior art requires a detailed knowledge of the protocol procedures required to load the updated parameter block into the mobile station.

The above problems are substantially alleviated, and an advance is made over the teachings of the prior art in accordance with Applicants'invention, wherein an object model represents all of the parameters that can be modified in an IS-683A mobile station. The details of the physical location of each parameter, as well as the necessary protocol procedures, (implemented in the set of airwave messages), are defined within this mobile object model. Hence, when any parameter is added or changed, it is necessary to provide the computer system only the identification of the parameter to be added or changed, and the value of that parameter. The computer system can then prepare a message sequence that defines the memory location in the mobile station to be changed, and the new value of the data for that memory location. Advantageously, this arrangement sharply reduces the total number of airwave messages transmitted to the mobile station, thus reducing the amount of required air time for a change, and reducing the probability that a mobile station will de-register before the updating process is complete. Advantageously, this arrangement greatly simplifies the task of the system administrator in preparing such changes. Advantageously, because of the great simplification of the process, and the reduction of the number of airwave messages sent to the mobile station, it is possible to make more small changes in parameter blocks such as the roaming list, instead of requiring such changes be aggregated into an occasional much larger change.

DETAILED DESCRIPTION

Figure 1:
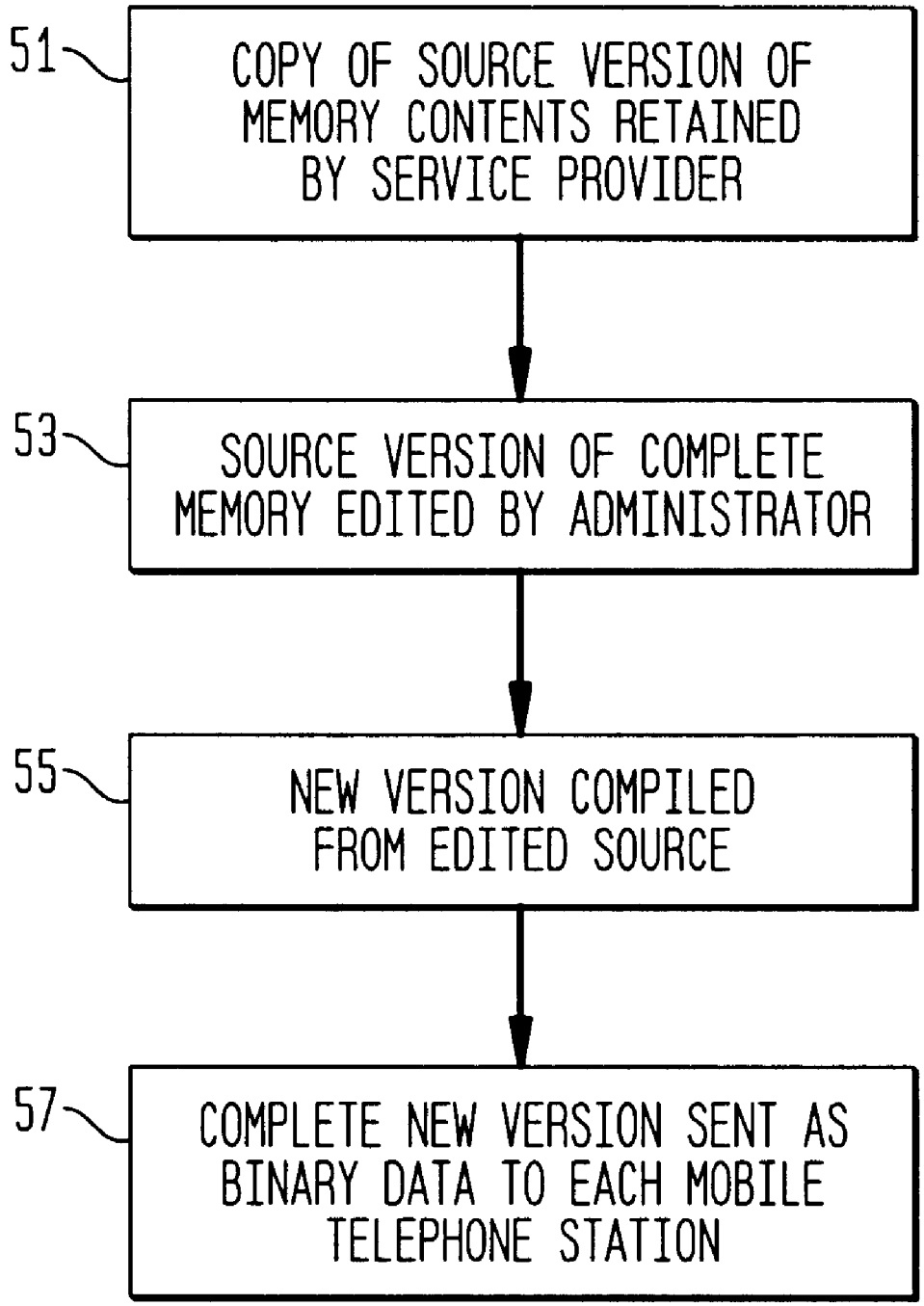
FIG. 1 is a flow diagram, illustrating the prior art.

FIG. 1 is a flow diagram illustrating in broad outline, the operation of the prior art. A copy of the source version of memory of the mobile stations to be updated is retained by the service provider, (Action Block 51). This copy is edited by a systems administrator at the source level, (Action Block 53). From the edited source, a new version of the contents of memory is compiled, (Action Block 55). The new version is sent in binary form to each mobile station to be updated, (Action Block 57).

The disadvantage of this approach is that the editing at the source level of source version is much more complex than the process described below, wherein only the source changes are considered. Secondly, by sending a full binary version of all of the parameters to each mobile station, the voice channel to each such station is occupied for a very much longer period of time than if only the changes were sent in accordance with Applicants' invention as described with respect to FIGS. 2 and 3.

A Glossary of Abbreviations is being provided as an Appendix to the Detailed Description.

Figure 2:
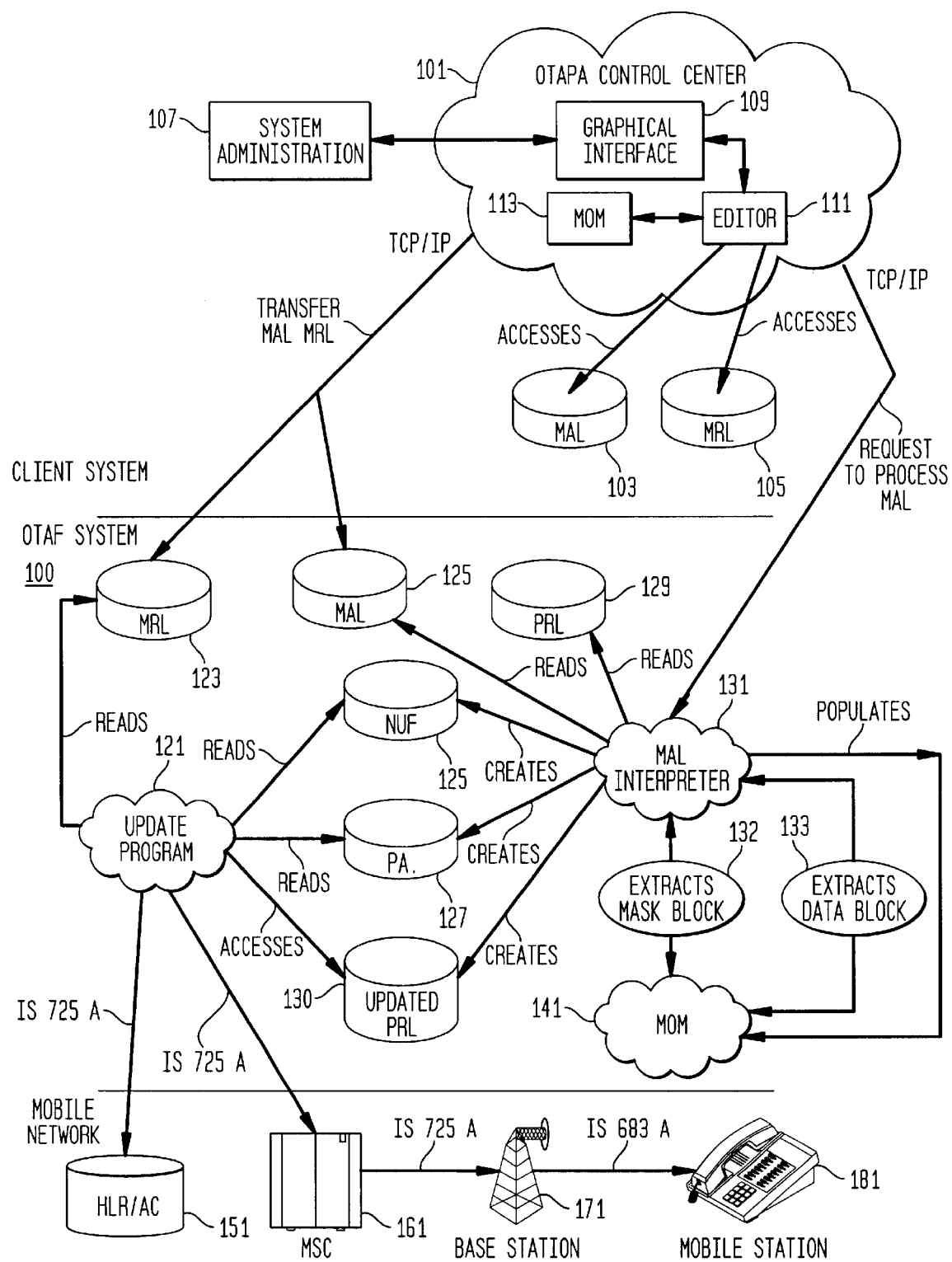
FIG. 2 is a block diagram, illustrating the operation of Applicants' invention.

FIG. 2 is a block diagram illustrating the Applicants' invention. The example parameter blocks to be modified by the Mobile Object Model (MOM) can be categorized as PRL and NAM, with the NAM blocks existing as several different types. For example, the MDN NAM block holds the directory number for calling the mobile. The CDMA NAM block holds parameters used when the mobile is operating in the PCS spectrum. The Dual Mode NAM block holds parameters used by a PCS or CDMA mobile while it is being used in the CDMA/analog spectrum. The IMSI_T block holds the true IMSI of the mobile station.

Processing Common to PRL and NAM

The Over-The-Air Parameter Administration (OTAPA) control center 101, originates the request for the Over-The-Air Function (OTAF 100), to update the memory content of mobile station 181. The parameters within appropriately equipped mobile stations, such as an IS-683A mobile station 181, are abstracted in a software mobile station model, hereafter termed the Mobile Object Model (MOM). This MOM has a full description of the properties and uses of each type of information stored for a MS. MOM contains memory layout information for all features that are supported for compliant mobiles. Specific sets of mobiles may not support and use all of the features, but the MOM is ready to support all. The set of features available for a particular class of service and mobile, is determined by the mobile manufacturer and the service provider. In the preferred embodiment, MOM 113 resides in the OTAPA control center, and as block 141, in the OTAF system 100. The system administrator 107 is connected to the OTAPA control center, where it interfaces with a graphic interface 109. The graphic interface communicates with an editor 111, which in turn, communicates with MOM 113, MAL 103 and MRL 105. The MOM defines a plurality of MS memory layouts for MSs with different classes of service.

The system administrator selects an object in the MOM 113, which represents a parameter block for update and provides new value(s) for attribute(s) in the block. There is no requirement that the system administrator have detailed knowledge of memory layouts in the mobile station 181. In other embodiments, the system administrator may use a variety of editors, (graphical or text-based), to select objects in the MOM 113, and to provide new values for those objects.

Ultimately, the language of the MOM 113 or 141 is represented as a file of commands, Mobile.Action List (MAL) 103, in the form of:

Target=Value

The Target represents the selected object in the MOM 113 to be assigned a value. The Value represents the new value for the selected object. The system administrator prepares a series of MAL 103 statements, specifying only those objects which require updating. The system administrator must also specify the mobile station 181, to which the updates will be applied. Both the MAL 103 statements, and the list of mobiles, Mobile Request List (MRL) 105, are supplied to the Over-the-Air-Function (OTAF) 100 using a message protocol built upon the well known Transmission Control Protocol/Internet Protocol (TCP/IP) suite. The MAL 103 and MRL 105 files are transmitted to MAL 123 and MRL 125 files in the OTAF 100.

In the OTAF 100, MAL 125 is provided to the MAL Interpreter 131. MAL processing is as follows:

The Target of each MAL 125 statement uses a dotted notation ('.'), to identify the particular MOM 141 object, and its associated attribute (parameter), to be updated. The symbol to the left of the "." is the highest level object, while the symbol to the right side of the '.', is the attribute to be updated. This attribute will either be contained in the highest level object, or contained within an associated lower level object, as dictated by object oriented Has-A (composition) and IS-A (Inheritance) relationship decomposition, of the implementation. MOM defines these relationships. Symbols in the dotted notation of the Mobile Action List (MAL) 125, identify the parameter blocks and parameters of IS-683A mobile stations. Ultimately, the Target is used to specify an offset and width within the electrically alterable memory of an IS-683A mobile, while the Value represents the updated contents of that memory.

The mobile object model contains a complete map of targets, including the mask associated with each target. The mobile object model is responsive to receipt of commands to manipulate inputs in order to identify a Target and to assign a Value to a target. Among the inputs which the mobile object model processes are the following:

IMSI_T

The IMSI_T NAM block contains the true IMSI of the mobile. This block can change, for example, if there is a change of the mobile's area code.

Mobile Directory Number

Since each mobile station stores its own directory number, this is part of the information which must be retained by the mobile object model.

PRL

The preferred roaming list is part of the data maintained in the model object model and governs the mobile station roaming behavior as previously stated in the Problem section.

Dual NAM

The CDMA NAM data contained in the mobile object model holds that data that is used while the mobile is operating in the PCS spectrum. The Dual NAM data contained in the mobile object model holds that data that is used when a PCS or CDMA mobile is operating in the CDMA/analog spectrum.

The object definition uses the unified modeling language (UML) described, for example, in D. Bruce: *Real-Time UML, Developing Efficient Objects For Embedded Systems*, Addison Wesley, Redding, Mass.; 1998.

In order to update the non-volatile data stored in one or a group of mobile stations, it is necessary to build a mobile object model for the station, and to use this mobile object model to identify the masks and the values associated with each mask, which must be modified in the target mobile station. The target station is first downloaded into the mobile object model of the OTAF system.

NAM Parameter Block Processing

For NAM block processing, parameters to be updated use a simple mask and data insertion technique at the specified offset into the IS-683A memory layout associated with the parameter. The MAL Interpreter 131, instantiates MOM 141 objects creating memory layout data 132,133. The first type of memory layout data 132, is a mask that will be used to clear data in the parameter block when it is first read back from the mobile station 181. The second type of memory layout data 133, is an overlay of the new value(s) to be inserted into the appropriate positions of the parameter block to be written back to the mobile station 181. The MAL Interpreter 131 performs an optimization step for the user by combining the mask and insertion memory layouts 132, 133, for each command in the MAL 125, generating memory layouts only for each updated parameter block.

Upon completion of processing the MAL 125, the MAL Interpreter 131, stores the memory layouts 132, 133, from the MOM 141, as NAM Block Update Files (NUF) 125. These files are read by the OTAF Update Programs 121, which control the mobile station update procedure. A command set Parameter Administration (PA) 127 file, is generated by the Mal Interpreter 131, that contains specific instructions for the OTAF Update Programs 121, pertaining to operations to perform on the mask and data information within the NUF 125.

PRL Parameter Block Processing

For PRL updates, it is required that the PRL 129 for the list of mobiles to be updated, be available to load into the MOM 141. This may require uploading the PRL from one of the Mobile Station 181's, if the PRL is not present on the OTAF 100. The MOM 141 representation of the PRL parameter block is then constructed based upon the current parameter information of the existing PRL 129. The PRL attributes within the MOM 141 are then updated based upon the information supplied at the OTAPA Control Center 101. Upon completion of processing MAL 125 statements, the MAL Interpreter 131 formats the memory layout from the MOM 141, creating an updated PRL 129 file. A corresponding command set Parameter Administration (PA) 127 file is generated, that contains specific instructions for the OTAF Update Programs 121. Both the updated PRL 129 and the PA 127 files are read by the OTAF Update Program 121, which performs the mobile station update procedure.

Since the PRL can have a bit count larger than what can be sent in one message to a mobile, the PRL may require IS-683A message segmentation. Consequently, these parameter blocks must be transported in multiple messages, each message carrying a segment of the parameter block. The second level optimization step of the MOM 141, allows for the identification of the exact segment(s) that must be updated. Only those segments would be written back to the mobile, rather than the entire PRL. A reduction in messages to the mobile station required to update the PRL would be realized, and is the most significant improvement offered over the prior art. As covered in the problem definition, the prior art can require up to five times the number of segments as the number made possible by the Applicants' invention.

The Update Program also provides change data to the Home Location Register (HLR) 151 and the Mobile Switching Center (MSC) 161 serving the Mobile Station (MS) 181. The MSC transmits messages from the Over-the-Air Function (OTAF) system to a base station 171 for transmission to the MS 181.

Installation of MOM in the Mobile Station

In an alternate embodiment, another level of optimization could be achieved by having the mobile vendor install the MOM within the mobile station, thereby performing parameter processing directly on the mobile. This would allow transferring only the specific parameter for update, rather than the entire segment that contains the raw memory overlay containing the parameter. This would further reduce message size, and further conserve bandwidth on the air interface. With the MOM embedded within the mobile station, as little as an offset and specific bit to modify for a parameter, could be sent as the data to update in the mobile. One problem with this alternate embodiment is that changes in MOM, resulting from changes in a generic program for controlling parameter updates, would have to be transmitted to, and thereby installed in, each affected mobile station.

SUMMARY OF MOBILE UPDATE PROTOCOL

The mobile update protocol is defined by IS-725A, and is summarized as follows (numeric references refer to FIG. 2):

1. The OTAF must obtain the address of the MSC 161 serving the mobile station by querying the Home Location Register (HLR) 151. The HLR 151 can immediately provide this address if the mobile station 181 is registered (i.e., powered up) in an area served by the mobile station's service provider. If the mobile station is not currently registered, the HLR 151 will asynchronously notify the OTAF 100 of the address of the serving MSC 161 when the mobile station does in fact register.
2. The OTAF 100 must then transport IS-683A messages as raw data in the data parameter portion of IS-725A (IS-41) data delivery messages. The serving MSC 161 will extract the IS-683A message from the IS-725A message, and transmit the IS-683A message through the Base Station 171 to the Mobile Station 181 using IS-683A airwave transport. The first such message will page the mobile station, and request permission to perform a parameter update.
3. If the mobile sation is satisfied of the OTAF's authority to perform the parameter update, the OTAF 100 will proceed to update the mobile.
4. Once parameters in the mobile sation have been updated, the OTAF 100 will transmit the IS-683A message that asks the mobile station 181 to commit the updates, after which the OTAF will terminate the call.

The Applicants' invention performs the parameter update as follows:

1. If the parameter update is for a NAM block, the OTAF first formats an IS-683A message that requests the mobile station's (181) current memory layout of the selected parameter block. This must be done for each mobile in the list due to the unique characteristics per mobile within the block that must be preserved during the update.
2. For NAM block update, the OTAF Update Program 121 is directed by instructions in the command set PA (127) file to clear the portions of the parameter block that will be updated using the mask layout 132 prepared by the MAL Interpreter 131, (performing a bitwise AND operation).
3. Continuing with the NAM block update, the OTAF then inserts (performing a bitwise OR operation), the new memory parameters into the cleared portions of the selected parameter block 133, which were read from the associated NAM block's NUF 125 file. An IS-683A message now transports the updated parameter block back to the mobile station completing the update.
4. If the parameter update is for a PRL, and the OTAF 100 does not have a copy associated with the mobiles to be updated, then the entire PRL 129 must be uploaded from one of the mobiles back to the OTAF 100. Advantageously, this step can be performed only once for the entire list of mobile stations.
5. The PRL 129 of the specific set of mobiles 181 to be updated, must be loaded into the MOM 141 to be modified by the MAL 125 statements on the OTAF. The MAL interpreter 131, having updated this PRL 129 with the parameter changes, creates a new updated PRL 130 file as well as the command set PA 127 file. Under the direction of the commands within the PA 127, the Mobile Update Program 121 downloads the contents of the updated PRL 130 to the mobiles in the list of mobiles, of the MRL 123 file.

The Applicants' invention thus enables:

1. Abstraction of the IS-683A mobile station parameter block memory layouts in the MOM, reducing the expert level knowledge required to perform parameter administration.
2. A reduction in the total number of messages that are needed to perform parameter administration.

The Mobile Object Model can be easily adapted to emerging standards in wireless technologies. The IS-2000 standard for third-generation cellular communications is backward compatible to the aforementioned IS-683A standard, and so, the MOM will be able to meet provisioning requirements in this new standard as well.

Figure 3:
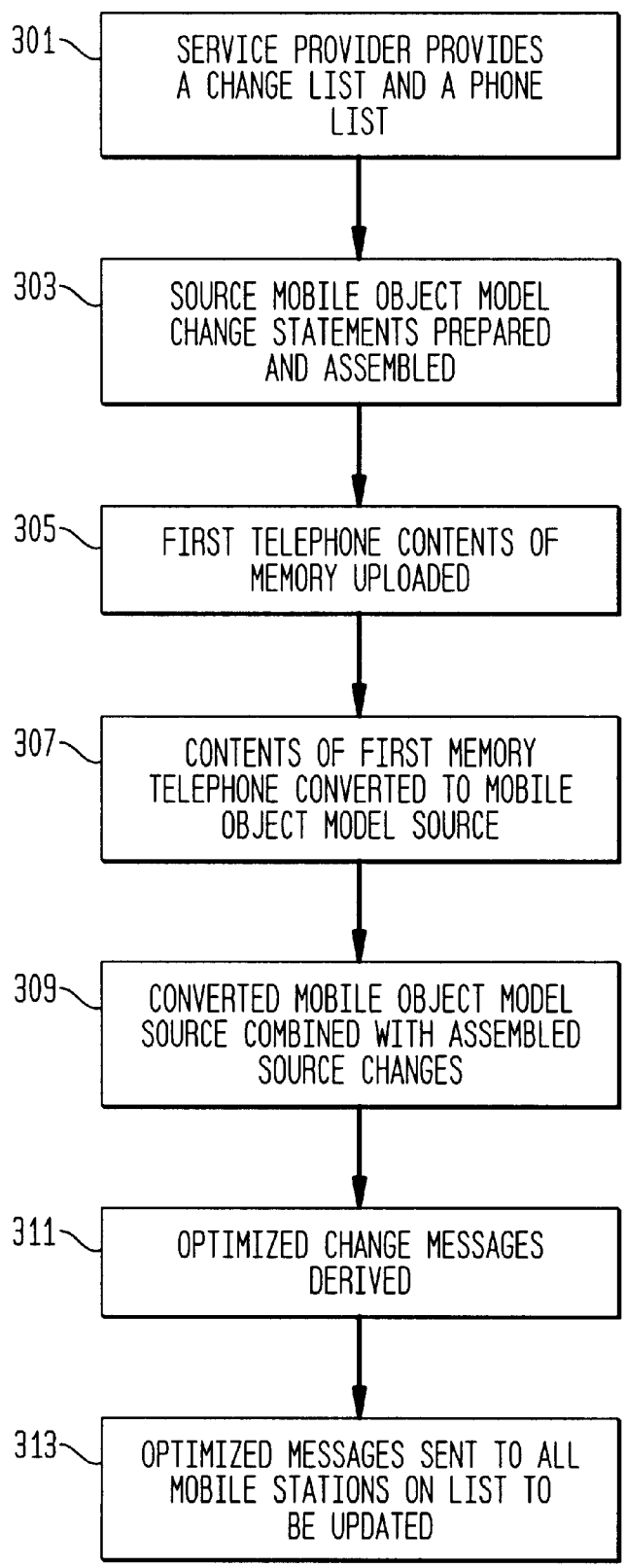
FIG. 3 is a flow diagram, illustrating the operation of Applicants' invention.

FIG. 3 is a flow diagram, illustrating the operation of Applicants' invention for PRL parameter block processing. A service provider provides to an operation support system, the OTAPA Control Center, a change list, (i.e., a list of parameters to be changed), and a phone list, (a list of the mobile stations to which the parameter change is to be applied), (Action Block 301). The source changes are converted into object model update statements by the system administrator, and are assembled using a mobile object model as the target, (Action Block 303). A first mobile station of the mobile stations to be updated, is uploaded to an OTAF system, a system for generating the actual messages to be sent to the mobile stations to be updated, (Action Block 305). The contents of the uploaded memory are converted to mobile object model source, (Action Block 307). These source statements are then combined with the assembled source changes to generate a new version of the contents of memory for the mobile stations to be updated, (Action Block 309). The revised contents of memory are compared with the contents of memory uploaded from a first mobile station in order to generate optimized change messages, i.e., change messages which will overwrite only those portions of memory that have been changed, (Action Block 311).

The above description is of one preferred embodiment of Applicants' invention. Many other variants of this embodiment will be apparent to those of ordinary skill in the art without departing from the scope of the invention. The invention is limited only by the attached claims.

APPENDIX

Glossary of Acronyms

| | |
|---|---|
| BS | Base Station |
| CDMA | Code Division Multiple Access |
| ESN | Electronic Serial Number |
| IMSI | International Mobile Station Identifier |
| MAL | Mobile Action List |
| MIN | Mobile Identification Number |
| MOM | Mobile Object Model |
| MRL | Mobile Request List |
| MS | Mobile Station |
| MSC | Mobile Switching Center |
| MSID | Mobile Station ID |
| NAM | Number Assignment Module |
| NUF | NAM Block Update File |
| OTAF | Over-The-Air Function |
| OTAPA | Over-The-Air Parameter Administration |
| OTASP | Over-The-Air Service Provisioning |
| PA | Parameter Administration file |
| PRL | Preferred Roaming List |
| TCP/IP | Transmission Control Protocol/Internet Protocol |

What is claimed is:

1. A method of performing Over-The-Air-Function (OTAF) updating of stored data in a wireless mobile station (MS) comprising the steps of:

providing a mobile object model (MOM) comprising a full description of the properties and values of the types of information stored in an MS;

storing parameters of said MS in accordance with the rules specified by said MOM;

responsive to receipt of a request for changing at least one parameter of said MS, deriving a set of messages comprising at least one message for updating data stored in said MS; and transmitting said set of messages to said MS for updating data stored in said MS;

wherein the process of deriving said set of messages comprises the steps of deriving a mask for specifying a location wherein said data is to be changed, using said MOM, and deriving values for said at least one parameter.

2. The method of claim 1, wherein said MOM defines MS memory layouts for a plurality of different MSs supporting different sets of features.

3. The method of claim 1, wherein the step of deriving values for said at least one parameter comprises the steps of:

entering information descriptive of said parameter; and using said MOM, deriving mask and parameter information from said information descriptive of said parameter.

* * * * *